(12) United States Patent
Vornbrock

(10) Patent No.: US 8,242,929 B2
(45) Date of Patent: Aug. 14, 2012

(54) WIRELESS DRILL STRING TELEMETRY

(75) Inventor: Theodore J. Vornbrock, Takoma Park, MD (US)

(73) Assignee: Raytheon Company, Waltham, MA (US)

( * ) Notice: Subject to any disclaimer, the term of this patent is extended or adjusted under 35 U.S.C. 154(b) by 983 days.

(21) Appl. No.: 12/190,452

(22) Filed: Aug. 12, 2008

(65) Prior Publication Data

US 2010/0039285 A1    Feb. 18, 2010

(51) Int. Cl.
*G01V 3/26* (2006.01)
(52) U.S. Cl. ............... 340/854.8; 340/853.7; 340/854.4; 340/855.1
(58) Field of Classification Search ............... 340/853.7, 340/854.4, 854.8, 855.1
See application file for complete search history.

(56) References Cited

U.S. PATENT DOCUMENTS

| | | | |
|---|---|---|---|
| 3,793,632 A | 2/1974 | Still | |
| 4,390,975 A | 6/1983 | Shawhan | |
| 4,914,433 A | 4/1990 | Galle | |
| 4,933,640 A * | 6/1990 | Kuckes | 324/339 |
| 5,138,263 A * | 8/1992 | Towle | 324/338 |
| 5,160,925 A | 11/1992 | Dailey et al. | |
| 5,818,352 A * | 10/1998 | McClure | 340/854.6 |
| 6,670,880 B1 * | 12/2003 | Hall et al. | 336/132 |
| 6,968,735 B2 | 11/2005 | Ziolkowski et al. | |
| 2005/0200498 A1* | 9/2005 | Gleitman | 340/854.4 |
| 2008/0265893 A1* | 10/2008 | Snyder et al. | 324/343 |

OTHER PUBLICATIONS

"Metallic Glass: Material of the Future?"—Mar. 30, 1998—Science Daily http://www.sciencedaily.com/releases/1998/03/980331074950.htm.*

* cited by examiner

*Primary Examiner* — David Bagnell
*Assistant Examiner* — Kyle Armstrong
(74) *Attorney, Agent, or Firm* — Cantor Colburn LLP

(57) ABSTRACT

A communication module for transfer of information along a drill string has at least one antenna coil, wherein the communication module is configured such that a central coil axis of the antenna coil is substantially perpendicular to a longitudinal axis of a drill pipe to which it is affixed. Signals are relayed magnetically from node to node to exchange data along any desired length of drill string. The drill string itself forms a portion of the magnetic flux path and the earth and/or surrounding media forms another substantial portion of the closed flux path. Magnetic induction is advantageous because the steel drill pipe is ferromagnetic and exhibits a magnetic permeability of a few hundred to a few thousand times that of air.

15 Claims, 3 Drawing Sheets

WIRELESS DRILL STRING TELEMETRY

FIELD OF THE INVENTION

The invention generally relates to a method and apparatus for information transmission and more particularly to information transmission within a drill hole.

BACKGROUND OF THE INVENTION

There are numerous inventions related to drill string telemetry, both by wire line and by wireless apparatuses. These include several inventions in which magnetic fields (near-field, induction) and low to high frequency electromagnetic waves (far-field, traveling waves) are a means of energy information transfer in or adjacent to a drill string.

U.S. Pat. No. 2,379,800, Signal Transmission System, by D. G. C. Hare, refer to the use of a transformer coupling at each pipe junction. One difficulty with the use of transformers is their high power requirements. U.S. Pat. No. 3,090,031, Signal Transmission System, by A. H. Lord, addresses these high power losses, and teaches the placement of an amplifier and a battery in each joint of pipe. However, the life of the battery became a critical consideration. In U.S. Pat. No. 4,215,426, Telemetry and Power Transmission For Enclosed Fluid Systems, by F. Klatt, an acoustic energy conversion unit is employed to convert acoustic energy into electrical power for powering the transformer junction.

Transformers operate upon Faraday's law of induction. Briefly, Faraday's law states that a time varying magnetic field produces an electromotive force which may establish a current in a suitable closed circuit. Faraday's law is:

emf=−dΦ/dt Volts;

where emf is the electromotive force in volts, and dΦ/dt is the time rate of change of the magnetic flux. The negative sign is an indication that the emf is in such a direction as to produce a current whose flux, if added to the original flux, would reduce the magnitude of the emf. This principal is known as Lenz's Law.

An iron core transformer has two sets of windings wrapped about an iron core. The windings are electrically isolated, but magnetically coupled. Current flowing through one set of windings produces a magnetic flux that flows through the iron core and induces an emf in the second windings resulting in the flow of current in the second windings. The iron core itself can be analyzed as a magnetic circuit, in a manner similar to DC electrical circuit analysis. Some important differences exist, however, including the often nonlinear nature of ferromagnetic materials.

Briefly, magnetic materials have a reluctance to the flow of magnetic flux which is analogous to the resistance materials have to the flow of electric currents. Reluctance is a function of the length of a material, L, its cross section, S, and its permeability U.

Reluctance=L/(U*S) (ignoring the nonlinear nature of ferromagnetic materials).

Any air gaps that exist in the transformer's iron core present a great impediment to the flow of magnetic flux because iron has a permeability that exceeds that of air by a factor of roughly four thousand. Consequently, a great deal of energy is expended in relatively small air gaps in a transformer's iron core. See generally, HAYT: Engineering Electro-Magnetics, McGraw Hill, 1974 Third Edition, p. 305-312.

The transformer couplings revealed in the abovementioned patents operate as iron core transformers with two air gaps. The air gaps exist because the pipe sections must be severable. U.S. Pat. No. 4,605,268, Transformer Cable Connector, by R. Meador, utilizes closely aligned small toroidal coils to transmit data across a pipe junction.

The Shell Oil Company telemetry system includes a modified tubular member, having electrical contact rings in the mating surfaces of each tool joint. The contact rings in each tubular member are electrically coupled by an insulated electrical conductor extending between each contact ring. The insulated electrical conductor is disposed in a fluid-tight metal conduit to isolate the conductor from the fluid in and around the drill string when the tubular members are connected in a drill string and lowered in a well bore. The Shell Oil Company approach is described in U.S. Pat. No. 4,095,865, Telemetering Drill String with Piped Electrical Conductor. A different helical conduit is disclosed in Well Bore Data System, U.S. Pat. No. 4,788,544, the latter conduit being designed to adhere to the bore of each tubular member. Both approaches have several shortcomings.

Since it is difficult to secure the helical conduit to the bore wall of each tubular member, the helical conduit is secured to each tubular member only at the pin and box ends of each tubular member. As the tubular members are manipulated in the well bore, this helical conduit may respond by oscillating like a spring, causing the conduit to rub against the bore wall of the tubular members, which in time may produce a breach in the helical conduit. Drilling fluid will enter such a breach and impair the operation of the data transmission system.

SUMMARY OF THE INVENTION

A communication module for transfer of information along a drill string has at least one antenna coil and is configured such that a central coil axis of the antenna coil is substantially perpendicular to a longitudinal axis of a drill pipe to which it is affixed.

DETAILED DESCRIPTION OF PREFERRED EMBODIMENTS

Figure 1:
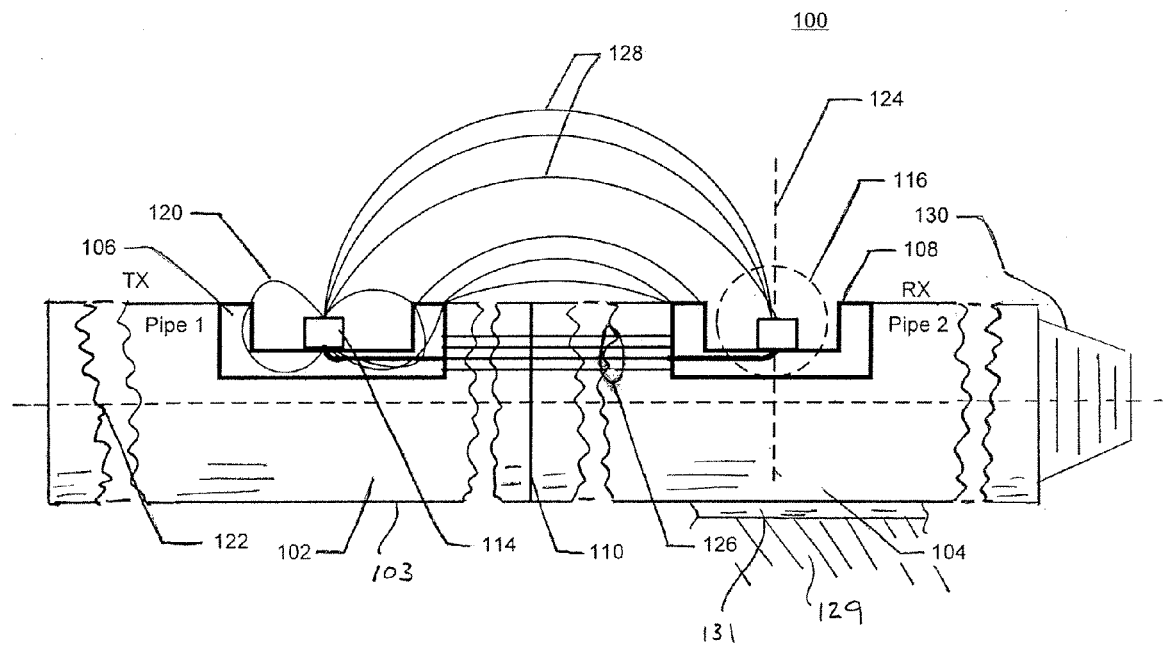
FIG. 1 is a diagrammatic side view of two drill pipe segments constructed in accordance with the invention.

Disclosed is a system of uncomplicated bit-wise data repeaters using inductive coupling between two or more locations on a drill string where information transmission is effected by coils mounted on or within the wall of a portion of the drill string with their central axis substantially perpendicular to the longitudinal axis of the drill string. It should be noted that the drill string itself forms a portion of the magnetic flux path and the earth and/or surrounding media forms another substantial portion of the closed flux path. In one embodiment of the invention, small form factor bobbin wound inductors, common to through-hole or surface-mount printed circuit board designs, are used. The use of these small, standard, off-the-shelf components, not typically intended for use as inductive communication antennae, is economically advantageous. It makes it possible to employ the system in cost-sensitive industrial uses such as contract horizontal directional drilling. The components may be assembled into a miniature module. According to a first embodiment of the invention, no module dimension is greater than the radial thickness of the drill pipe wall. According to a second embodiment of the invention, the module's length along the axis of the drill pipe may be several times the wall thickness. In the first and second embodiments mentioned in this paragraph, and in other embodiments, the wall thickness (the thickness of the drill pipe wall) should not be exceeded in the radial direction (i.e. there should be no breach of the drill pipe wall by the module) and the strength of the pipe should not be compromised. According to another aspect of the invention, the module may be compact enough so that the module does not interfere with the strength or operability of the drill pipe.

The disclosed system for wireless bidirectional data communication along a ferromagnetic drill string utilizes magnetic induction and signal relaying. In a preferred embodiment of the invention, a series of induction coils co-located with powered signal repeater nodes are situated at predetermined intervals along a drill string. Signals are relayed magnetically from node to node to exchange data along any desired length of drill string.

Magnetic induction is advantageous in this application because steel drill pipe is ferromagnetic and exhibits a magnetic permeability of a few hundred to a few thousand times that of air depending on the specific composition of the steel. A magnetic field preferentially occupies the path of least reluctance, which is the least magnetic resistance, which is inversely proportional to permeability. An alternating magnetic field is created by an alternating current (AC) signal made to flow through an appropriate inductor, typically a coil of wire, mounted on or around the drill pipe, thereby creating a magnetic flux "Φ", that is defined by the magnetic field "B" times the perpendicular cross-sectional area that it penetrates. The presence of a highly permeable material such as drill pipe steel has the effect of increasing the effective area of the inductor, and correspondingly increasing the magnetic flux. Lines of flux are thus concentrated by the drill pipe, which acts as a conduit for the alternating magnetic field. Using the magnetic component of an electromagnetic signal in the possibly moist, and ionically conductive subterranean environment, is preferable to conventional electromagnetic traveling wave signals, e.g., radio waves, which do not propagate very far, and may in fact be completely grounded by the soil and water surrounding the drill string. In contrast, the magnetic component of an electromagnetic signal is not significantly affected by the presence of non-ferrous conductive media.

The magnetic field created by a change in current through an inductor obeys the law of reciprocity such that an electromotive force or voltage will be generated across a second inductor located proximate the first inductor. The magnetic field strength decreases as a function of increased distance between the two inductor coils at a rate of $1/r^3$ in terms of the resulting voltage, or $1/r^6$ in terms of power transfer. These are the signal path loss exponents. Thus, to reliably exchange signals between two coils, the coils are preferably close enough to each other relative to the magnitude of AC, the inductance value of the coils, and the permeability of the intervening material to generate a voltage at the second coil. These parameters should be considered in the design of an inductive drill string telemetry system. The exponential nature of path loss, however, substantially precludes using magnetic signals over the distances common in commercial drilling operations, unless a system for relaying the signals is utilized.

There are several methods of relaying signals along the necessary length of the drill string that can be used. Common to the methods is that additional energy is provided to relay a signal along an increasing length of the drill string to overcome the loss incurred by the exponential path loss as a function of distance. In one embodiment, digital data encoding combined with a form of time-domain repeating offers a method of signal relaying. For example, digital data may be represented by On-Off-Keying (OOK) of a sinusoidal current driving an inductive transmit (TX) coil at a first node. The magnetic energy, representing each one-bit of the digital data, is transferred along the drill string across one or more drill pipe sections and the associated threaded joint(s) until it is detected at a second node by a receive (RX) coil. In a preferred embodiment, the RX coil is located on the drill pipe with some form of repeater circuitry. The details of a suitable repeater circuit are known to those in the art and, therefore, for the sake of efficiency, will not be discussed herein. At the RX coil, the magnetic energy is converted into a voltage and decoded by comparison to a threshold voltage. In a preferred embodiment, the threshold voltage is set above the ambient noise floor.

In operation, when the received voltage exceeds the threshold voltage or is determined to be a valid one-bit by any other suitable method, the repeater circuitry located at the second node generates a signal that is applied to its TX coil. In one embodiment, the RX coil and the TX coil are the same coil. In another embodiment, there are separate TX and RX coils. Valid signals are then transmitted from the second node to, for example, a third node, and so on.

To prevent a node's transmission from being detected and repeated by the node from which the signal just came, the encoding and timing of the receive-retransmit cycle is preferably set to make this impossible, given the data rate defined for the telemetry system. In one embodiment, data is RTZ (return-to-zero) encoded so that a one-bit is represented by a period of signal ON followed by a period of signal OFF, and a zero-bit is represented by two periods of signal OFF. In other words, both one and zero bits end with a period of signal OFF. Additionally, the timing of the signal ON/OFF periods is set to ensure that a node is not receptive to the immediate retransmission of its own signal by its neighboring node. This is accomplished by making the NRZ timing asymmetric with a longer trailing OFF period than the leading ON period.

In one embodiment, a 9600 bps (bits-per-second) data rate is encoded in the following manner: A zero-bit will simply be represented by 1/9600=104 microseconds of signal OFF and a one-bit will be represented by 42 microseconds signal ON, typically followed by 62 microseconds of signal OFF. This results in an approximate 40% signal duty cycle (time-division). Provided a receive node can adequately detect and decode the 42 microseconds signal and initiate its own 42 microseconds retransmission, the original node will still be awaiting completion of its 62 microseconds signal OFF period, and therefore not receptive to the retransmission. Meanwhile, a third node will detect retransmission and perform its own signal relaying operation.

Although various node-to-node communication protocols may be used, each communication mode preferably follows the rule that if a valid bit is received, transmit that bit, and then become inactive for a short period before attempting to receive subsequent bits. The inactive period is typically shorter than the inter-bit data rate to avoid missing the next bit in the data series, but longer than twice the time for electromagnetic propagation between nodes (and practically speaking much longer than that time-of-flight). Frequency-division, and so-called M-ary modulation methods can be used in one embodiment. Numerous relaying systems may be used in conjunction with the inductive signaling system described herein.

Figure 2:
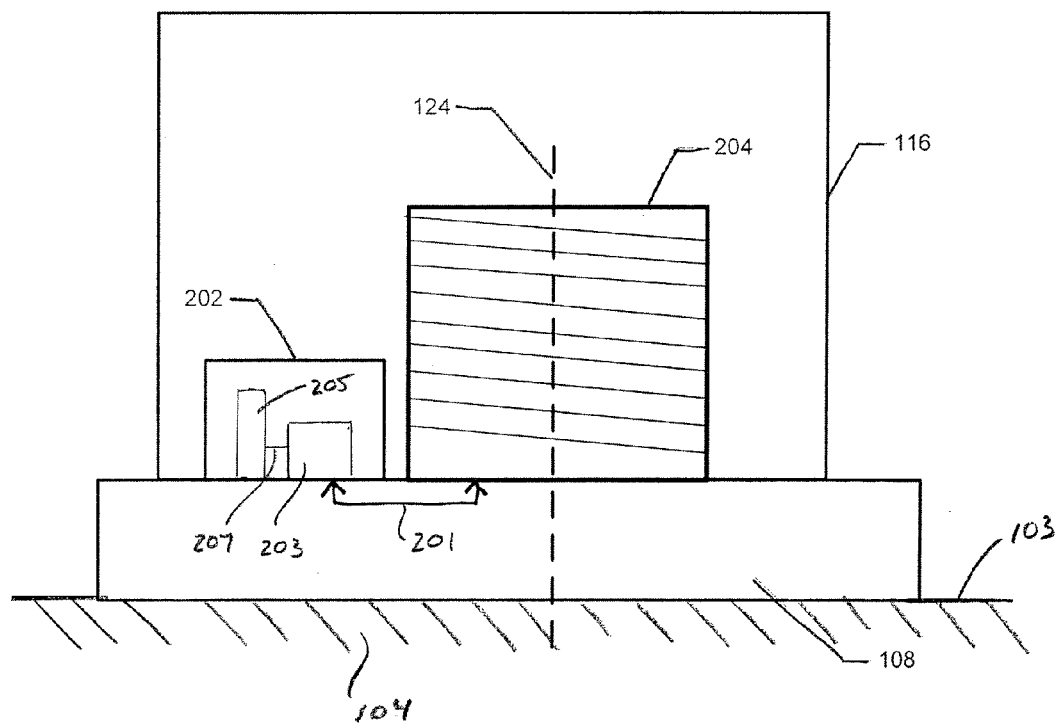
FIG. 2 is an enlarged diagrammatic view of a portion of one of the segments of FIG. 1.

FIG. 1 depicts an exemplary embodiment 100 of the invention. Typically, drill pipe segments 102, 104 are attached using threads 130, creating a connection seam 110. As shown in FIG. 1, communication modules 114, 116 are coupled to drill pipe segments 102, 104, respectively. Each communication module 114, 116 includes an antenna 204 and a repeater 202 (FIG. 2). While communication modules 114, 116 are shown in FIG. 1 mounted to the outer surface 103 of the respective drill pipe segments 102, 104, the communication modules 114, 116 may alternatively be mounted within the walls of the pipes, or mounted on internal surfaces of the pipes. In one embodiment, the communication modules 114, 116 are each coupled to a high magnetic permeability material substrate 106, 108, which is itself then coupled to the respective drill pipe segments 102, 104. The high magnetic permeability material substrates 106, 108 channel the magnetic flux some distance from the coil 204 to minimize short circuited magnetic flux lines 120.

Each of the communication modules 114, 116 includes an antenna coil 204 that is oriented such that its central coil axis 124 is substantially perpendicular to the longitudinal axis 122 of the drill pipe. The high magnetic permeability substrates 106, 108 may include powdered or solid ferrite compositions, thin sheets of amorphous, metallic glasses, or iron alloy designed for low eddy-current loss factor such as E-steel shims used in laminate transformer cores. In one embodiment, the antenna is designed with the high permeability substrate as an integral part of the coil. Due in part to the orientation of the coils, a majority of the flux lines 126 are transmitted through the drill pipe segments 102, 104. Other flux lines 128 are transmitted through the surrounding medium 129. In the illustrated embodiment, the medium is the earth, and may include rock 129. The drill string 102, 104 is located within a generally cylindrical bore 131 drilled into the rock 129.

As depicted in FIG. 1, communication module 114 coupled to drill pipe segments 102 is acting in transmission mode and communication module 116 coupled to drill pipe segment 104 is in reception mode. In a preferred embodiment, communication is bidirectional. For simplicity, not all of the magnetic flux lines are depicted.

In one embodiment, the system uses electromagnetic signals in the VLF, LF, MF, or HF bands, e.g., 3 KHz to 30 MHz. Preferably, the LF band of 30 KHz to 300 KHz for the industrial-scientific-medical unlicensed band between 160 KHz and 190 KHz is used to encode the information. The transmission and received coils are preferably surface-mount technology coils and, typically off the shelf components used in switching power supply circuits.

Drill pipe segments 102, 104 are typically used in horizontal directional drilling (HDD) systems. Each drill pipe segment 102, 104 preferably includes one or more communication modules 114, 116 to permit communication along the length of the drill pipe segments 102, 104. It should be noted that based on the power and frequency used, the spacing of the modules will vary.

FIG. 2 depicts an exemplary embodiment of communication module 116 in accordance with the invention. Communication module 116 includes a repeater 202 coupled (201) to an antenna coil 204. In a preferred embodiment, antenna coil 204 functions as both the transmit and receive antenna. In another embodiment there are separate transmit and receive antennas. Antenna coil 204 has its central coil axis 124 substantially perpendicular to the longitudinal axis of the drill pipe 104. In a preferred embodiment, the repeater 202 and antenna coil 204 are mounted on a high magnetic permeability substrate 108. In another embodiment, only antenna coil 204 utilizes the high magnetic permeability substrate 108. If desired, the repeater 202 is provided with suitable repeater circuitry 203 and a battery 205. The battery 205 supplies power (207) to the repeater circuitry 203.

Figure 3:
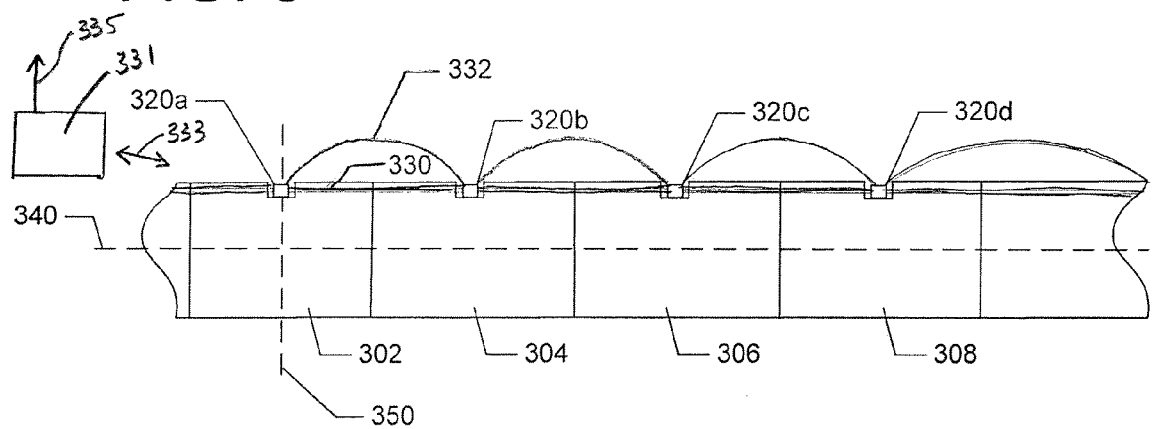
FIG. 3 is a diagrammatic view of an exemplary system in accordance with an embodiment of the invention.

FIG. 3 depicts a drill string in accordance with one embodiment of the invention. As shown, drill pipe segments 302, 304, 306, and 308 are coupled to create a segment of a drill string. While four drill pipe segments are shown, the overall drill string can be any number of segments in length. As shown, each segment of the drill string 302, 304, 306, and 308 has at least one communication module 320. While each drill pipe segment 302, 304, 306, and 308 is shown having a single communication module 320, it should be noted that a single drill pipe segment may have more than one communication module 320 and, in other situations, a single communication module 320 may be configured to transmit and receive data across several drill pipe segments.

As shown, communication modules 320a-320d are coupled to drill pipe segments 302, 304, 306, and 308, respectively. The communication modules 320 are configured for bi-directional communication. The modules communicate via magnetic flux lines 330 transmitted through the length of the drill string. Additionally, other flux lines 332 couple communication modules 320 external to the drill string.

Each communication module 320 includes one or more antenna coils. Each antenna coil has a coil axis parallel to coil axis line 350. Further, line 340 represents a longitudinal axis of the drill pipe. The coil axis line 350 and longitudinal axis of the drill pipe 330 are substantially perpendicular to one another. In operation, signals 333 generated at the end of the drill string 302, 304, etc. are supplied to a processor 331 which outputs (335) telemetry information to a user. The telemetry information may represent the position and/or condition of the other end of the drill string 302, 304, etc.

Figure 4:
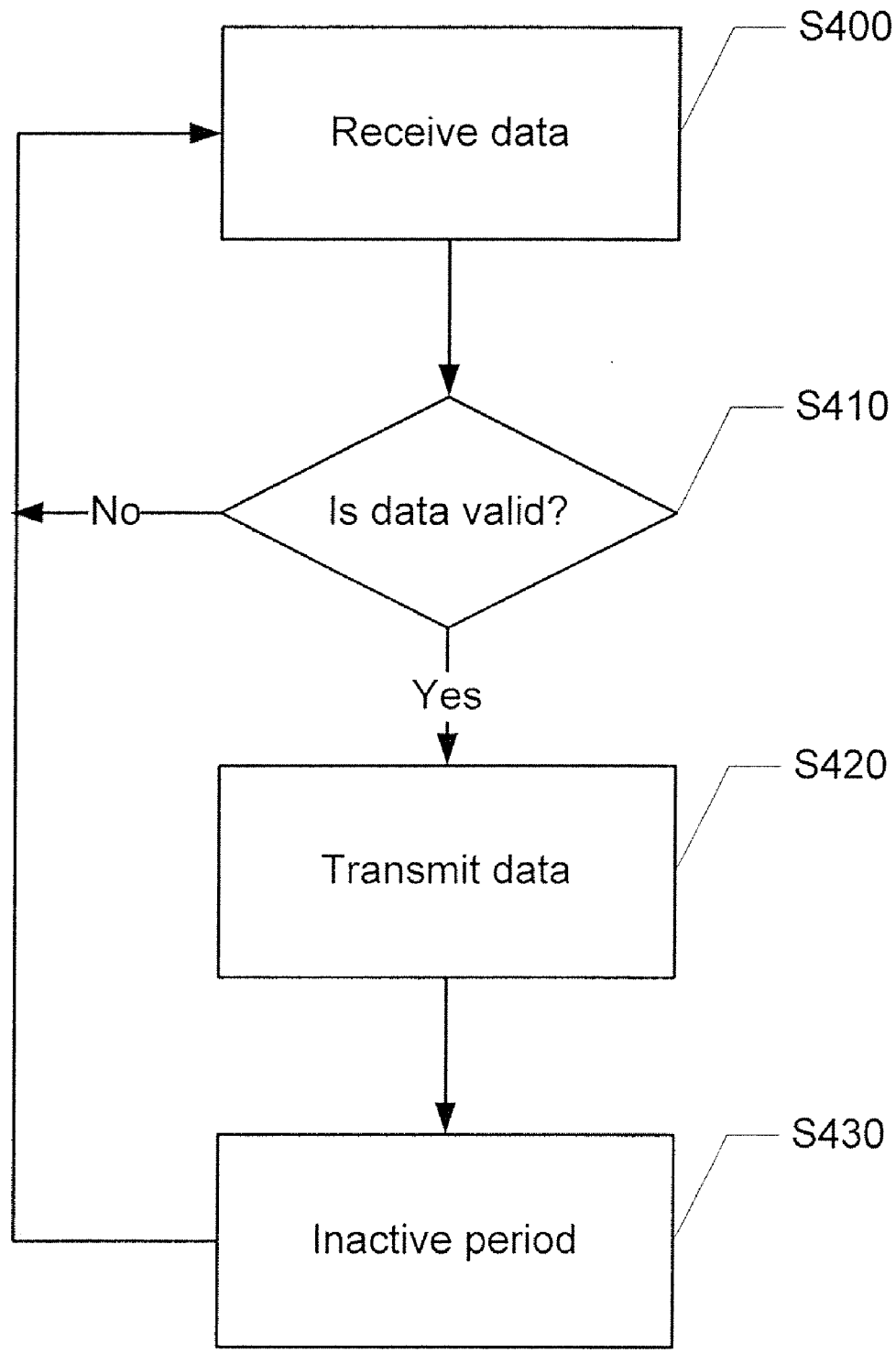
FIG. 4 is a flowchart for operating a communication module in accordance with an embodiment of the invention.

FIG. 4 is a flow chart depicting communication according to one embodiment of the invention. In operation, a first communication module 114 receives an input voltage (S400). The communication module then preferably determines if the voltage represents a valid data bit (S410). If the received signal represents a valid data bit, the data is transmitted to the next node 116 (S420). After the bit is transmitted (S420), the receiver becomes inactive for a short period before attempting to receive subsequent bits to reduce self excitation (S430). It should be noted that the inactive period is typically shorter than the inter-bit data rate.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof

What is claimed is:

1. A communication module for inductive transfer of information along a drill string, said module comprising:
   at least one antenna coil; and
   wherein the communication module is configured to be affixed to the drill string within a recess formed in an outer surface thereof such that a central coil axis of the antenna coil as a whole is substantially perpendicular to a longitudinal axis of the drill string and a length of the antenna coil is aligned with a radial dimension of the drill string; and
   wherein the communication module for transfer of information along a drill string includes a high magnetic permeability material substrate upon which the at least one antenna coil is mounted, and wherein the communication module is configured such that the high magnetic permeability material substrate is located between the antenna coil and the drill string with the communication module abutting the high magnetic permeability material substrate in the radial dimension and being axially spaced from the high magnetic permeability material substrate along the longitudinal axis of the drill string.

2. The communication module for transfer of information along a drill string according to claim 1, wherein the at least one antenna coil is an induction coil.

3. The communication module for transfer of information along a drill string according to claim 2, wherein the communication module is configured for bidirectional communication.

4. The communication module for transfer of information along a drill string according to claim 1, further comprising a signal repeater coupled to the at least one antenna coil.

5. The communication module for transfer of information along a drill string according to claim 4, wherein the antenna coil is mounted on the high magnetic permeability material substrate.

6. The communication module for transfer of information along a drill string according to claim 5, configured for attachment to an outer surface of the drill string.

7. The communication module for transfer of information along a drill string according to claim 4, configured to operate substantially between 30 KHz and 30 MHz.

8. The communication module for transfer of information along a drill string according to claim 1, wherein the high magnetic permeability material substrate is a ferrite composition.

9. The communication module for transfer of information of information along a drill string according to claim 1, wherein the high magnetic permeability material substrate is an amorphous metallic glass.

10. The communication module for transfer of information along a drill string according to claim 1, wherein the high magnetic permeability material substrate is an iron alloy designed for low eddy-current loss factors.

11. A system for bidirectional transfer of information along a drill string, said system comprising:
a plurality of communication modules, each having at least one antenna coil and a signal repeater coupled to the at least one antenna coil, each communication module affixed to a respective drill pipe of the drill string within a recess formed in an outer surface thereof, wherein the communication module is configured such that a central coil axis of the antenna coil as a whole is substantially perpendicular to a longitudinal axis of the respective drill pipe and a length of the antenna coil is aligned with a radial dimension of the respective drill pipe;
the system further comprising a high magnetic permeability material substrate upon which each antenna coil is mounted,
each of the communication modules being configured such that the high magnetic permeability material substrate is located between the antenna coil and the respective drill pipe with each of the communication modules abutting the high magnetic permeability material substrate in the radial dimension of the respective drill pipe and being axially spaced from the high magnetic permeability material substrate along the longitudinal axis of the respective drill pipe.

12. The system for bidirectional transfer of information along a drill string according to claim 11, configured such that, after data is received by a communication module, the data is transmitted and the communication module becomes inactive for a short period before attempting to receive subsequent data, and wherein the inactive period is shorter than a data rate.

13. A method of transferring information along a drill string, said method comprising the steps of:
providing a plurality of drill pipes;
providing a plurality of communication modules, each having at least one antenna coil and a signal repeater coupled to the at least one antenna coil, each communication module affixed to a respective one of the drill pipes within a recess formed in an outer surface thereof, wherein the communication module is configured such that a central coil axis of the antenna coil as a whole is substantially perpendicular to a longitudinal axis of the respective drill pipe and a length of the antenna coil is aligned with a radial dimension of the respective drill pipe, each of the communication modules being configured such that high magnetic permeability material substrate is located between the antenna coil and the respective drill pipe with each of the communication modules abutting the high magnetic permeability material substrate in the radial dimension of the respective drill pipe and being axially spaced from the high magnetic permeability material substrate along the longitudinal axis of the respective drill pipe;
causing a first one of the antenna coils to receive a magnetic signal from a second one the antenna coils; and
then, causing the first one of the antenna coils to send a magnetic signal to a third one of the antenna coils.

14. The method of claim 13, further comprising the step of transmitting at least one of said signals through a high magnetic permeability material substrate associated with a corresponding one of the communication modules.

15. The method of claim 13, wherein data is received by a communication module, and then the data is transmitted and the communication module becomes inactive for a short period, and then attempting to receive subsequent data, wherein the inactive period is shorter than a data rate.

* * * * *